United States Patent Office 2,955,977
Patented Oct. 11, 1960

2,955,977
TERTIARY DODECYL MERCAPTO-SODIUM ACETATE AS PEST COMBATTING AGENT

Paul F. Warner, Phillips, Tex., assignor to Phillips Petroleum Company, a corporation of Delaware No Drawing. Filed Dec. 9, 1958, Ser. No. 779,056

5 Claims. (Cl. 167—22)

This invention relates to the combatting of insects. In one of its aspects, the invention relates to the killing of an insect by subjecting said insect to the action of tertiary dodecyl mercapto-sodium acetate.

In another of its aspects, the invention provides a pest combatting composition comprising as an essential active ingredient tertiary dodecyl mercapto-sodium acetate. In a further aspect of the invention, it provides a method of killing an insect by applying to said insect an insecticidal quantity of tertiary dodecyl mercapto-sodium acetate. In a still further aspect, the invention provides a method of killing a grasshopper by contacting said grasshopper with tertiary dodecyl mercapto-sodium acetate.

Man's fight to protect himself and his goods, crops, etc. against the ravages of insect life has been waged for a very long time. That insect combatting agents which are available have not solved this one of man's most pressing problems, namely, the fight against insects, is eloquently proven by the millions of dollars worth of damage suffered anually by man due to destruction of his goods, especially his crops, by invasions of insects, for example, grasshoppers.

It has now been discovered that tertiary dodecyl mercapto-sodium acetate is an effective insect combatting agent and can be applied with great effectiveness to combat and to kill grasshoppers.

It is an object of this invention to combat insect life. A further object of the invention is the provision of a method of combatting an insect. A still further object of the invention is a method of killing an insect. A further object of the invention is a method of combatting grasshoppers. A still further object of the invention is a method of killing grasshoppers. A still further object is the provision of an insect combatting composition.

Other aspects, objects and several advantages of this invention are apparent from a study of this disclosure and the appended claims.

According to this invention, there are provided a method and composition for combatting an insect, for example, a grasshopper, the method comprising subjecting said insect to the action of tertiary dodecyl mercapto-sodium acetate and the composition comprising said tertiary dodecyl mercapto-sodium acetate dispersed in a suitable insect combatting adjuvant carrier.

Presently, a concentration of 0.1 to 2 weight percent of tertiary dodecyl mercapto-sodium acetate in water is found to give effective results. Since the tertiary dodecyl mercapto-sodium acetate is soluble in water, a surface active agent is not necessary but can be added to obtain certain desired effects, such as wetting of the body of the insect more efficiently and/or a situs at which the insect may alight.

The active ingredient of the invention can be prepared by reaction of sodium tertiary dodecyl mercaptide with monochloro sodium acetate, as illustrated by the following equation.

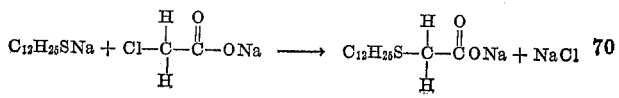

The product is a white odorless paste and has excellent detergent properties. It is because of the properties of the product that it is not necessary to add a surface active agent in every case.

EXAMPLE

During the latter part of the summer, grasshoppers being plentiful in the area of test, these insects were placed in a large beaker, covered with a piece of screen wire and sprayed with water solutions of the compound to be tested. Also, a piece of absorbent paper was dusted with the chemical or impregnated with a spray thereof, dried and placed in the bottom of the beaker in which the hoppers contacted the chemical only with their feet. In some cases after application of the chemical to the grasshoppers' feet, peculiar paralytic effects were caused and the hoppers would shed a leg.

Observations of the effect of the treatments on the grasshoppers were made and recorded at 12, 24 and 48 hours elapsed time. Data are shown in the table below in which malathion and tetraethylpyrophosphate were used as controls.

Table

| | Method of Application | Concentration, wt. percent | Number Treated | Number Dead at hrs. | | | Percent Kill at 48 hrs. |
|---|---|---|---|---|---|---|---|
| | | | | 12 | 24 | 48 | |
| Tert-dodecyl mercapto-sodiumacetate. | Spray hoppers. | 0.1 | 10 | 5 | ---- | ---- | -------- |
| | ---do------ | 0.1 | 10 | 3 | 8 | 8 | 80 |
| Malathion 57%. | ---do------ | 0.1 | 10 | 0 | 5 | 8 | 80 |
| Tetraethylpyrophosphate. | ---do------ | 0.1 | 10 | 4 | 10 | 10 | 100 |

From the foregoing table, it will be seen that, at a very low concentration of the active ingredient of the invention, very effective results have been obtained.

In the table, "malathion 57%" means that the solution contained 57 percent of malathion. The concentration of 0.1 weight percent given in the table means 0.1 weight percent of malathion 57 percent in water or, actually, 0.1 of 57 weight percent malathion in water.

Reasonable variation and modification are possible within the scope of the foregoing disclosure and the appended claims to the invention, the essence of which is that tertiary dodecyl mercapto-sodium acetate has been found to be a desirably effective active ingredient in the combatting of insects.

I claim:
1. A method of combatting an insect which comprises subjecting said insect to the action of tertiary dodecyl mercapto-sodium acetate.
2. A method of killing an insect which comprises contacting said insect with an insecticidal quantity of tertiary dodecyl mercapto-sodium acetate.
3. A method of killing an insect which comprises applying to said insect a solution in water of 0.1 to 2 weight percent by weight of the solution of tertiary dodecyl mercapto-sodium acetate.
4. A method of killing a grasshopper which comprises applying to said insect a quantity sufficient to kill the same of tertiary dodecyl mercapto-sodium acetate.
5. A pest combatting composition of a material comprising tertiary dodecyl mercapto-sodium acetate dispersed in a pesticidal adjuvant carrier.

References Cited in the file of this patent
UNITED STATES PATENTS

| 1,986,218 | Remy | Jan. 1, 1935 |
| 2,212,895 | Allen | Aug. 27, 1940 |